(12) United States Patent
Chen et al.

(10) Patent No.: US 10,679,148 B2
(45) Date of Patent: Jun. 9, 2020

(54) IMPLICIT BRIDGING OF MACHINE LEARNING TASKS

(71) Applicant: Google LLC, Mountain View, CA (US)

(72) Inventors: Zhifeng Chen, Sunnyvale, CA (US); Michael Schuster, Saratoga, CA (US); Melvin Jose Johnson Premkumar, Sunnyvale, CA (US); Yonghui Wu, Fremont, CA (US); Quoc V. Le, Sunnyvale, CA (US); Maxim Krikun, Castro Valley, CA (US); Thorsten Brants, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/402,787

(22) Filed: May 3, 2019

(65) Prior Publication Data

US 2019/0258961 A1    Aug. 22, 2019

Related U.S. Application Data

(63) Continuation of application No. PCT/US2017/059776, filed on Nov. 2, 2017, which is
(Continued)

(51) Int. Cl.
*G06N 20/00* (2019.01)
*G06N 3/04* (2006.01)
(Continued)

(52) U.S. Cl.
CPC .............. *G06N 20/00* (2019.01); *G06F 40/44* (2020.01); *G06F 40/47* (2020.01); *G06N 3/0445* (2013.01); *G06N 3/0454* (2013.01); *G06N 3/063* (2013.01)

(58) Field of Classification Search
CPC ........................... G06N 20/00; G06F 17/2818
See application file for complete search history.

(56) References Cited

U.S. PATENT DOCUMENTS 9,195,656 B2 * 11/2015 Fructuoso ............. G06F 17/289
2007/0094169 A1 * 4/2007 Yamada ............. G06F 17/2809
706/15
(Continued)

OTHER PUBLICATIONS

Dzmitry Bandanau, Neural Machine Translation by Jointly Learning to Align and Translate, Sep. 2014, Cornell University.*
(Continued)

*Primary Examiner* — Vincent Gonzales
*Assistant Examiner* — Seth Andrew Raker
(74) *Attorney, Agent, or Firm* — Fish & Richardson P.C.

(57) ABSTRACT

Methods, systems, and apparatus, including computer programs encoded on computer storage media for performing machine learning tasks. One method includes receiving (i) a model input, and (ii) data identifying a first machine learning task to be performed on the model input to generate a first type of model output for the model input; augmenting the model input with an identifier for the first machine learning task to generate an augmented model input; and processing the augmented model input using a machine learning model. An exemplary system applying implicit bridging for machine learning tasks, as described in this specification, trains a machine learning model to perform certain types of machine learning tasks without requiring explicit training data for the certain types of machine learning tasks to be used during training.

15 Claims, 3 Drawing Sheets

Related U.S. Application Data a continuation of application No. 15/394,708, filed on Dec. 29, 2016.

(60) Provisional application No. 62/418,098, filed on Nov. 4, 2016.

(51) Int. Cl.
  *G06N 3/063* (2006.01)
  *G06F 40/44* (2020.01)
  *G06F 40/47* (2020.01)

(56) References Cited

U.S. PATENT DOCUMENTS

2017/0031901 A1* 2/2017 Song .................. G06F 17/2705
2017/0323203 A1* 11/2017 Matusov ............... G06F 17/289

OTHER PUBLICATIONS

Abadi et al. "Tensofflow: A system for large-scale machine learning," arXiv preprint arXiv 1605.08695 , May 2016, 18 pages.
Bandanau et al. "Neural machine translation by jointly learning to align and translate," International Conference on Learning Representations, 2015, 15 pages.
Caglayan et al. "Does multimodality help human and machine for translation and image captioning?," Proceedings of the First Conference on Machine Translation, 2016, 7 pages.
Caruana "Multitask learning," Learning to learn, Springer, 1997, pp. 95-133.
Cho et al. "Learning phrase representations using RNN encoder-decoder for statistical machine Translation," CoRR, 2014, 15 pages.
Dong et al. "Multi-task learning for multiple language translation," In Proceedings of the 53rd Annual Meeting of the Association for Computational Linguistics and the 7th International Joint Conference on Natural Language Processing of the Asian Federation of Natural Language Processing, 2015, 10 pages.
Firat et al "Zero-resource translation with multi-lingual neural machine translation," arXiv preprint arXiv 1606.04164, Jun. 2016, 10 pages.
Firat et al. "Multi-way, multilingual neural machine translation with a shared attention mechanism," Conference of the North American Chapter of the Associates for Computational Linguistics: Human Language Technologies, CA, 2016, 10 pages.
Gillick et al. "Multilingual language processing fromBytes," CoRR, 2015, 11 pages.
International Preliminary Report on Patentability issued in International Application No. PCT/US2017059776, dated Feb. 20, 2019, 24 pages.
International Search Report and Written Opinion issued in International Application No. PCT/US2017059776, dated Feb. 16, 2018, 16 pages.
Jason et al "Fully character-level neural machine translation without explicit segmentation," arXiv preprint arXiv 1610.03017, Oct. 2016, 15 pages.
Johnson et al. "Google's Multilingual Neural Machine Translation System: Enabling Zero-Shot Translation," arXiv preprint arXiv1611. 04558, Nov. 2016, 17 pages.
Luong et al. "Addressing the rare word problem in neural machine translation," Proceeding of the $53^{rd}$ Annual Meeting of the Association for computational Linguistics and the $7^{th}$ International Joint Conference on Natural Language Processing, 2015, 9 pages.
Luong et al. "Effective approaches to attention-based neural machine translation," Conference on Empirical Methods in Natural Language Processing, 20115, 11 pages.
Luong et al. "Multi-task sequence to sequence learning," International Conference on Learning Representations, 2015, 10 pages.
Maaten et al. "Visualizing Data using t-SNE," Journal of Machine Learning Research 9, 2008, 27 pages.
Richens. "Interlingual machine translation," The Computer Journal 1, 3, 1958, 4 pages.
Schuster et al. "Japanese and Korean voice search," 2012 IEEE International Conference on Acoustics, Speech and Signal Processing, 2012, 4 pages.
Sebastien et al. "On using very large target vocabulary for neural machine translation," Proceedings of the $53^{rd}$ Annual Meeting of the Association for Computational Linguistics and the $7^{th}$ International Joint Conference on Natural Language Processing, 2015, 10 pages.
Sennrich et al. "Neural machine translation of rare words with subword Units," Proceedings of the 54th Annual Meeting of the Association for Computational Linguistics, 2016, 11 pages.
Sennrich et al. "Controlling politeness in neural machine translation via side constraints," Conference of the North American Chapter of the Association for Computational Linguistics. Human Language Technologies, CA, 2016, pp. 35-40.
Sutskever et al. "Sequence to sequence learning with neural networks," In Advances in Neural Information Processing Systems, 2014, 9 pages 3104-3112.
Tsvetkov et al. "Polyglot neural language models: A case study in cross-lingual phonetic representation learning," CoRR, 2016, 10 pages.
Written Opinion issued in International Application No. PCT/US2017/059776, dated Nov. 19, 2018, 13 pages.
Wu et al., "Google's Neural Machine Translation System: Bridging the Gap between Human and Machine Translation," Oct. 8, 2016 [online] (retrieved from https://arxiv.org/pdf/1609.08144.pdf), 23 pages.
Zhou et al. "Deep recurrent models with fast-forward connection for neural machine translation," CoRR, 2016, 13 pages.
Zoph et al. "Multi-source neural translation," The 2016 Conference of the North American Chapter of the Association for Computational Linguistics: Human Language Technologies, CA, arXiv 1601. 00710, Jan. 2016, 30-34 pages.

* cited by examiner

IMPLICIT BRIDGING OF MACHINE LEARNING TASKS

CROSS-REFERENCE TO RELATED APPLICATIONS

This application is a continuation of International Application No. PCT/US2017/059776, filed on Nov. 2, 2017, which is a continuation of U.S. application Ser. No. 15/394,708, filed on Dec. 29, 2016, which claims priority to U.S. Provisional Application No. 62/418,098, filed on Nov. 4, 2016. The entire disclosures of each of the prior applications are considered part of and are incorporated by reference in the disclosure of this application.

BACKGROUND

Machine translation systems require large amounts of parallel training data to achieve high levels of accuracy. Generally, it is difficult to obtain large amounts of parallel data for languages spoken by fewer people than languages spoken by many people. For example, a majority of text found on the internet is English, whereas the amount of text found in languages such as Japanese or Korean is lower. This makes obtaining parallel data for smaller languages challenging.

Traditional machine translation systems overcome this problem by bridging translations between smaller languages through a third language, namely translating a portion of text in a first language to a third language, then translating from the third language into a second language. Such a bridging process suffers from many problems, including propagation of errors, increased latency and increased system complexity.

SUMMARY

The subject matter described in this specification can be implemented in particular embodiments so as to realize one or more of the following advantages:

A system applying implicit bridging for machine learning tasks, as described in this specification, trains a machine learning model to perform certain types of machine learning tasks without requiring that explicit training data for the certain types of machine learning tasks to be used during training. For example, the system may perform zero-shot translation to train a machine learning model to translate Japanese text segments into corresponding Korean text segments, even if training data for this type of task was not used during training. Therefore, explicit bridging for translation is avoided, thus avoiding propagation of errors, reducing latency of the machine learning tasks and reducing system complexity. For example, the decoding speed may twice as fast since no explicit bridging through a third language is necessary when translating from Japanese to Korean.

Furthermore, once the machine learning model has been trained, a system performing zero-shot translation, as described in this specification, may achieve high levels of accuracy that are comparable to, if not better than, systems applying explicit bridging for translation.

A system performing zero-shot translation, as described in this specification, may use a single machine learning model to perform machine translation between N languages instead of having N^2 separate models, thus reducing the time required and complexity of model parameter tuning, as well as reducing computational resources consumed by the machine learning model. In addition, the reduction in the number of models may enable more language pairs to be used inside a single device, since serving machines usually have limited memory. Furthermore, the reduction in the number of models may drastically simplify system architecture, improving the production/set up time associated with the system.

A system performing zero-shot translation, as described in this specification, may allow for scaling to additional languages. For example, new data may be added to an existing model, possibly with over- or under-sampling such that all languages are appropriately represented, and used with a new prepended token if the target language changes. No changes to the architecture of the existing model are required.

A system performing zero-shot translation, as described in this specification, may allow for low-resource language improvements. All parameters of the system are implicitly shared by all language pairs being modeled. This forces the system to generalize across language boundaries during training. Translation accuracy on low resource language pairs may be improved when language pairs with little available data and language pairs with abundant data are mixed into the single system.

Various example implementations described herein relate to neural networks. Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Neural networks may be trained on machine learning tasks using training data to determine trained values of the layer parameters and may be used to perform machine learning tasks on neural network inputs.

In general, one innovative aspect of the subject matter described in this specification can be embodied in methods for training a machine learning model on training data, wherein the machine learning model is configured to receive an augmented model input comprising a model input with an identifier for a machine learning task to be performed on the model input, and perform the machine learning task on the received augmented model input to generate a respective type of model output for the model input, and wherein the method comprises: obtaining training data comprising a plurality of paired datasets, wherein each of the paired datasets comprise (i) an input dataset, and (ii) an output dataset; and training the machine learning model on the training data to perform a plurality of machine learning tasks, wherein the plurality of machine learning tasks includes the machine learning task to be performed on the model input.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the augmented model input comprises a model input with a prepended token identifier for the machine learning task.

In some implementations the model input comprises a model input of a first input type and the model output comprises a model output of a first output type, and the plurality of paired datasets does not include an input dataset of the first input type paired with an output dataset of the first output type.

In some implementations the datasets in the plurality of paired datasets comprise text segments in different languages.

In some implementations the method further comprises generating the training data, comprising: generating vocabularies of a fixed size V in each of the different languages; and merging the generated vocabularies to generate a new vocabulary by sequentially selecting a highest occurring word in each generated vocabulary until a size of the new vocabulary reaches V.

In some implementations each paired dataset comprises an input text segment in an input language paired with a text segment in a target language that is different from the input language.

In some implementations the plurality of machine learning tasks comprises, for each paired dataset, translating an input text segment into a text segment in the target language.

In some implementations the augmented model input comprises a model input with a prepended token indicating at least the target language.

In general, one innovative aspect of the subject matter described in this specification can be embodied in methods for receiving (i) a model input, and (ii) data identifying a first machine learning task to be performed on the model input to generate a first type of model output for the model input; augmenting the model input with an identifier for the first machine learning task to generate an augmented model input; and processing the augmented model input using a machine learning model, wherein the machine learning model has been trained on training data to perform a plurality of machine learning tasks including the first machine learning task, and wherein the machine learning model has been configured through training to: process the augmented model input to generate a first machine learning model output of the first type for the model input.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations augmenting the model input with an identifier comprises prepending a token identifier for the first machine learning task to the model input.

In some implementations the training data comprises a plurality of paired datasets, wherein each of the paired datasets comprises an input dataset paired with an output dataset, and the model input is of a first type of model input and the plurality of paired datasets does not include a pairing of datasets comprising an input dataset of the first type of model input paired with an output dataset of the first type of model output.

In some implementations the datasets in the plurality of paired datasets comprise text segments in different languages, and each paired dataset comprises an input text segment in an input language paired with a text segment in a target language that is different from the input language.

In some implementations the plurality of machine learning tasks comprises, for each paired dataset, translating an input text segment into a text segment in the target language.

In some implementations augmenting the model input with an identifier for the machine learning task to generate an augmented model input comprises prepending a token indicating at least the target language to the model input.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for performing machine learning tasks using implicit bridging. For example, a zero-shot translation system trains a machine translation model to translate text in a source language to text in a target language using training data from a set of language pairs, e.g., English-Japanese, Japanese-English, English-Korean, Korean-English. Through training, the zero-shot translation system learns to translate unseen language pairs, e.g., Korean-Japanese and Japanese-Korean, even if no explicit data of this type has been used in training. As another example, a system learns to construct parse tree representations of text and trains a machine learning model to predict a sentiment of a given parse tree using training data from a set of (sentence, parse tree) and (parse tree, sentiment) pairs. Through training, the system learns to directly predict a sentiment of a given sentence, even if no explicit data of this type has been used in training.

Figure 1:
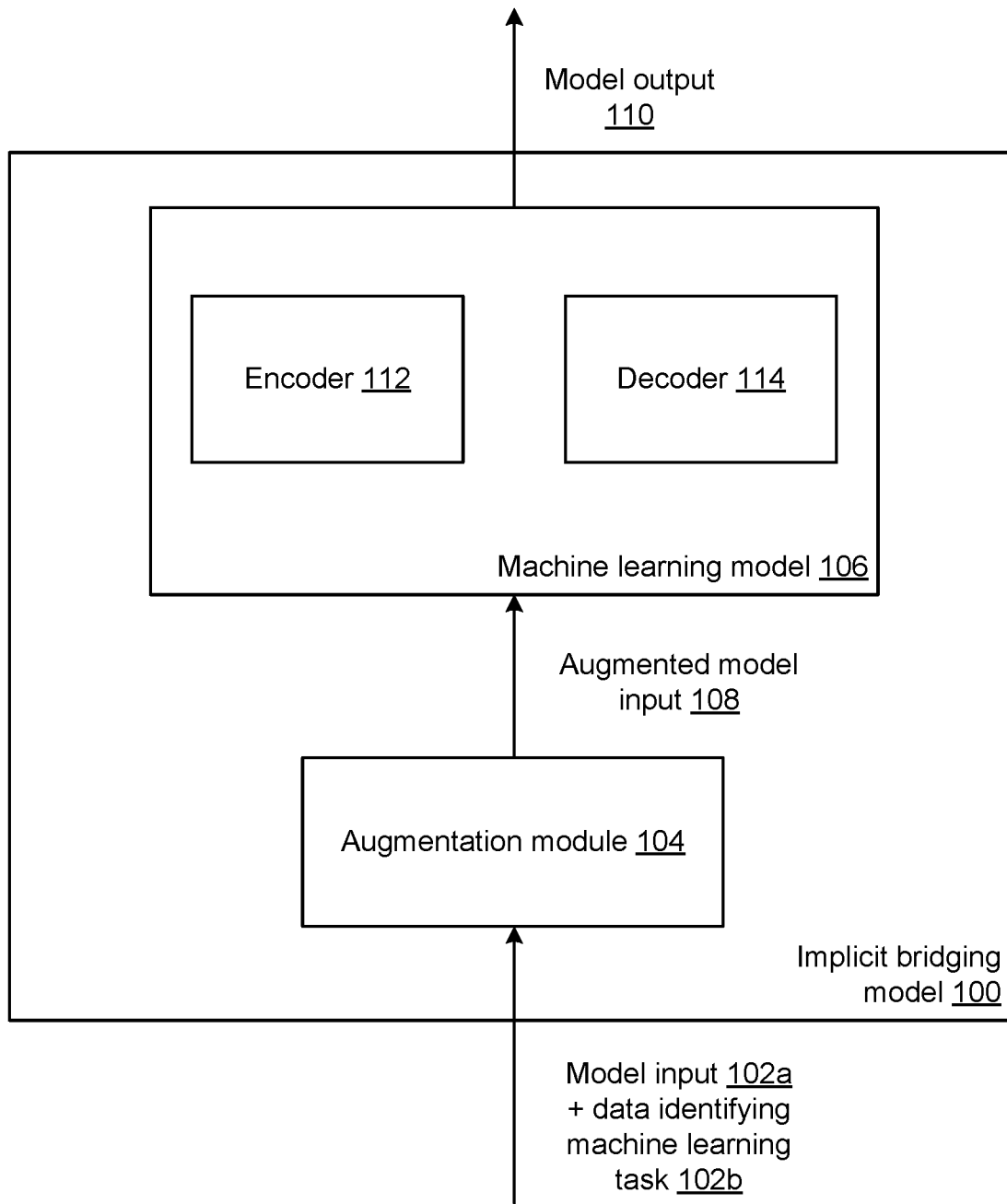
FIG. 1 shows an example implicit bridging system for performing machine learning tasks.

FIG. 1 shows an example implicit bridging system 100 for performing a machine learning task. For example, the system 100 may be a system used to perform zero-shot translation, as described in more detail below. Other machine learning tasks include sentiment analysis or other natural language processing tasks. The system 100 is an example of a system implemented as computer programs on one or more computers in one or more locations, in which the systems, components, and techniques described below can be implemented.

The implicit bridging system 100 receives a model input 102a and data identifying a machine learning task to be performed on the model input 102b. The implicit bridging system 100 processes the received model input 102a and data identifying the machine learning task to be performed on the model input 102b using an augmentation module 104 and a machine learning model 106 to generate a model output 108. The generated model output 108 is a particular type of model output. For example, in some cases the model input may be a text segment in a source language, e.g., "Hello, how are you?" and the machine learning task to be performed on the text segment may be to translate the text segment from the source language into a target language, e.g., translate "Hello, how are you?" from English into Spanish. In this example, the target language may represent the type of the generated model output.

The augmentation module 104 receives the model input 102a and data identifying a machine learning task to be performed on the model input 102b, and augments the model input 102a with an identifier for the first machine learning task to generate an augmented model input 108. In some implementations the augmentation module 104 augments the model input 102a by prepending a token identifier for the first machine learning task to the model input. For example, as described above, in some cases the model input 102a may be a text segment in a source language and the machine learning task to be performed on the text segment may be to translate the text segment from the source language into a target language. In this example, the augmentation module 104 may prepend a token indicating at least the target language to the model input. For example, the augmentation module 104 may prepend the token <2xx>, where "xx" represents a target language code, e.g., EN for English or JP for Japanese. Continuing the example above, the augmented model input 108 may be <2ES> Hello, how are you?

In some implementations the augmentation module 104 may also augment an output text segment in a target language by prepending the token <2xx> to the output text segment, e.g., instead of a standard token <s>. For example, in some cases prepending a text segment in a target language may be beneficial, since encoding the input text segment in the source language is then independent of the target language. This may allow for translation of one text segment in a source language into many languages with only one encoding.

In some implementations the augmentation module may prepend a text segment in a source language with a "<xx>" symbol and prepend a corresponding text segment in the target language with a "<xx>" token. For example, in some cases this type of prepending may enable the system to add monolingual data to the machine learning model, e.g., for low-resource languages. In these cases, the augmentation module 104 may be configured to receive the model input 102a and data identifying a machine learning task to be performed on the model input 102b, as well as an output from the machine learning model 106.

The machine learning model 104 receives the generated augmented model input 108. The machine learning model 104 has been configured through training to process the augmented model input 108 to generate a machine learning model output 110 for the model input 102a. The type of machine learning model output generated by the machine learning model is dependent on the received augmented model input, i.e., the machine learning task identifier, and the type of tasks that the machine learning model has been trained to perform. For example, continuing the example above, the machine learning model output 110 may be "Hola, como estas?" Training a machine learning model to perform implicit bridging of machine learning tasks is described in more detail below with reference to FIG. 3.

The machine learning model 104 includes an encoder component 112 and a decoder component 114. In some implementations the encoder component 112 and the decoder component 114 are both recurrent neural networks. In some implementations the decoder neural network may include an attention mechanism, and may include a softmax output layer. An example neural machine translation model is described in more detail in "Google's Neural Machine Translation System: Bridging the Gap between Human and Machine Translation," Wu, Yonghui, et al., *arXiv:* 1609.08144 (2016).

As described above, in some cases the model input 102a may be a text segment in a source language and the machine learning task to be performed on the text segment may be to translate the text segment from the source language into a target language. The source language may be one of many possible source languages, and the target language may be one of many possible target languages. In these cases the machine learning model 106 may include an encoder that is shared over different source languages, a decoder that is shared over different target languages, and a shared vocabulary of size V across the different languages. In some implementations the vocabulary may be a shared word piece vocabulary, that is a vocabulary containing sub word units which may be assembled into words.

In some implementations the implicit bridging system 100 may be configured to generate the shared vocabulary. For example, the system 100 may generate multiple vocabularies of a fixed size V in each of multiple languages and merge the generated vocabularies to generate a new, single vocabulary of size V. For example, the system 100 may sequentially select a highest occurring word in each generated vocabulary until a size of the new vocabulary reaches V. Optionally, the system may remove duplicated words from the generated vocabulary until the size of the new vocabulary reaches V. For example, when generating a vocabulary that merges English words with German words, the system may de-duplicate the English word "die" with the German article "die."

In some cases the vocabulary may include a probability distribution of words across different languages, e.g., a uniform distribution where for n different languages the generated vocabulary includes V/n words in each language. In other cases the vocabulary may include a data-driven distribution of words across the different languages, e.g., the generated vocabulary may include different numbers of words in each language In some cases the implicit bridging system 100 may be configured to generate model outputs that are translations of received model inputs into a single target language. In these cases the machine learning model 106 may include an encoder 112 that is shared over different source languages, a decoder for the single target language and a vocabulary that is shared across the different source languages. In other cases the implicit bridging system 100 may be configured to generate model outputs that are translations of received model inputs in a single source language into multiple target languages.

Figure 2:
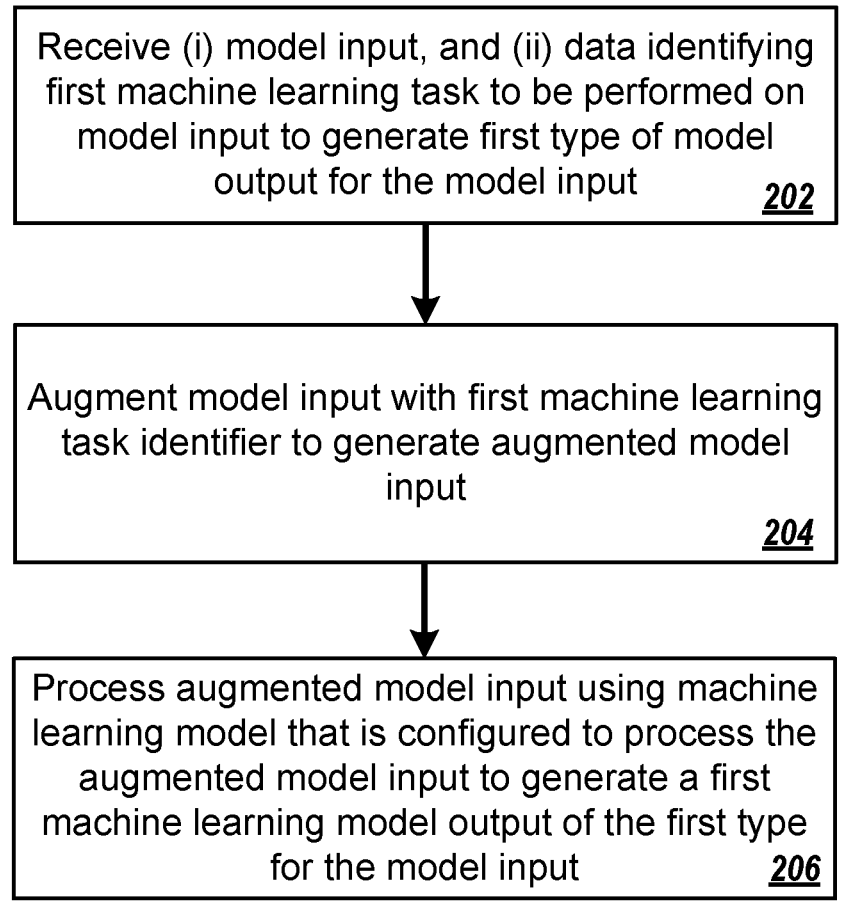
FIG. 2 is a flow diagram of an example process for performing implicit bridging of machine learning tasks.

FIG. 2 is a flow diagram of an example process for performing implicit bridging of machine learning tasks. For convenience, the process 200 will be described as being performed by a system of one or more computers located in one or more locations. For example, a system including a machine learning model, e.g., the implicit bridging system 100 of FIG. 1, appropriately programmed in accordance with this specification, can perform the process 200.

The system receives (i) a model input, and (ii) data identifying a first machine learning task to be performed on the model input to generate a first type of model output for the model input (step 202). For example, in some implementations the received model input may include a text segment in a source language, e.g., Japanese. The received data identifying a first machine learning task to be performed on the model input to generate a first type of model output for the model input may include data identifying the task of translating the text segment in the source language to generate a corresponding text segment in a target language, e.g., Korean. In other implementations the received model input may include a text segment and the received data identifying a first machine learning task to be performed on the model input to generate a first type of model output for the model input may include data identifying the task of predicting a sentiment of the text segment.

The system augments the model input with an identifier for the first machine learning task to generate an augmented model input (step 204). In some implementations the system may augment the model input with an identifier for the first machine learning task by prepending a token identifier for the first machine learning task to the model input. For example, in cases where the model input is a text segment in a source language and the machine learning task includes translating the text segment into a text segment in a target language, the system may prepend the text segment in the source language with a "<2xx>" token, where xx represents a target language code, e.g., EN for English or DE for German. As another example, in cases where the model input is a text segment and the machine learning task includes predicting a sentiment of the text segment, the system may prepend the text segment with a "<2sentiment" token.

As another example, the system may prepend the text segment in the source language with an additional token that also indicates the source language, e.g., <s> <EN><DE> How are you></s> <s> Wie geht es Ihnen?</s>. In some cases this approach may be beneficial, e.g., when translating homonyms from two different languages that have different meanings such as "die" in English and "die" in German. When prepending a text segment with tokens that indicate the source language and the target language, the order of the tokens must be maintained in each example. The system may then learn that the first token indicates the source language and the second token indicates the target language, or vice versa.

Alternatively, in some cases the system may augment an output text segment in a target language by prepending the token <2xx> to the output text segment, e.g., instead of a standard token <s>. In some cases prepending a text segment in a target language may be beneficial, since encoding the input text segment in the source language is then independent of the target language. This may allow for translation of one text segment in a source language into many languages with only one encoding.

As a further alternative, e.g., to enable multilingual and monolingual training, in some cases the system may prepend a text segment in a source language with a "<xx>" symbol and prepend a corresponding text segment in the target language with a "<xx>" token. In some cases this method of prepending may enable the system to add monolingual data to the machine learning model, e.g., for the low-resource languages. For example, when training an English, Hindi, Punjabi machine learning model with Punjabi as the low-resource language, the system may include monolingual Punjabi data to the model via the following <pa> Punjabi sentence </s> <pa> Punjabi sentence </s>.

In these examples, the system may be exposed to an increased amount of Punjabi text and can learn about the Punjabi vocabulary and rare words, even if the system is not directly translating text segments from or into Punjabi. In this manner, the machine learning model's capability to translate text segments into or from Punjabi may be increased.

The system processes the augmented model input using a machine learning model (step 206). The machine learning model is a machine learning model that has been trained on training data to perform a set of machine learning tasks including the first machine learning task, and has been configured through training to process the augmented model input to generate a first machine learning model output of the first type for the model input.

For example, the first machine learning task may be the task of translating a model input into a particular language, e.g., Korean, and the machine learning model may have been trained on training data to perform the tasks of translating a given model input into one or more languages including the particular language, e.g., the machine learning model may have been trained to translate a given model input into English, Korean and Japanese. As another example, the first machine learning task may be the task of predicting a sentiment of a text segment, and the machine learning model may have been trained on training data to perform two subtasks—generating a parse tree representation of a given model input and predicting a sentiment of a parse tree representation.

In some cases the training data used to train the machine learning model may include a set of paired datasets, where each of the paired datasets includes an input dataset paired with an output dataset. In this case the model input may be of a first type of model input and the set of paired datasets may not include an input dataset of the first type of model input paired to an output dataset of the first type of model output.

For example, the model input may be a text segment in a source language, e.g., Japanese, which is to be translated into a text segment of a target language, e.g., Korean. In this case the training data used to train the machine learning model may include a set of pairs of text segments in different languages, e.g., (Japanese, English), (English, Japanese), (Korean, English), (English, Korean), where the set of pairs of text segments in different languages does not include a pairing of text in the source language with text in the target language, e.g., (Japanese, Korean). However, since the machine learning model has been trained to receive model inputs that include text segments in Japanese, e.g., when translating a text segment in Japanese to a text segment in English, and has been trained to translate a given text segment into Korean, e.g., through processing the training data pair (English, Korean), the machine learning model has been trained to perform zero-shot translation, e.g., through text segments in English, and is able to directly translate a text segment in Japanese into a corresponding text segment in Korean.

As another example, the model input may be a text segment whose sentiment is to be predicted. In this case the training data used to train the machine learning model may include pairs of sentences and respective parse tree representations, and pairs of parse tree representations and respective sentiments. Using this training data, the system may be trained to directly predict a sentiment of a given text segment. Training a machine learning model to perform implicit bridging of machine learning tasks is described in more detail below with reference to FIG. 3.

Figure 3:
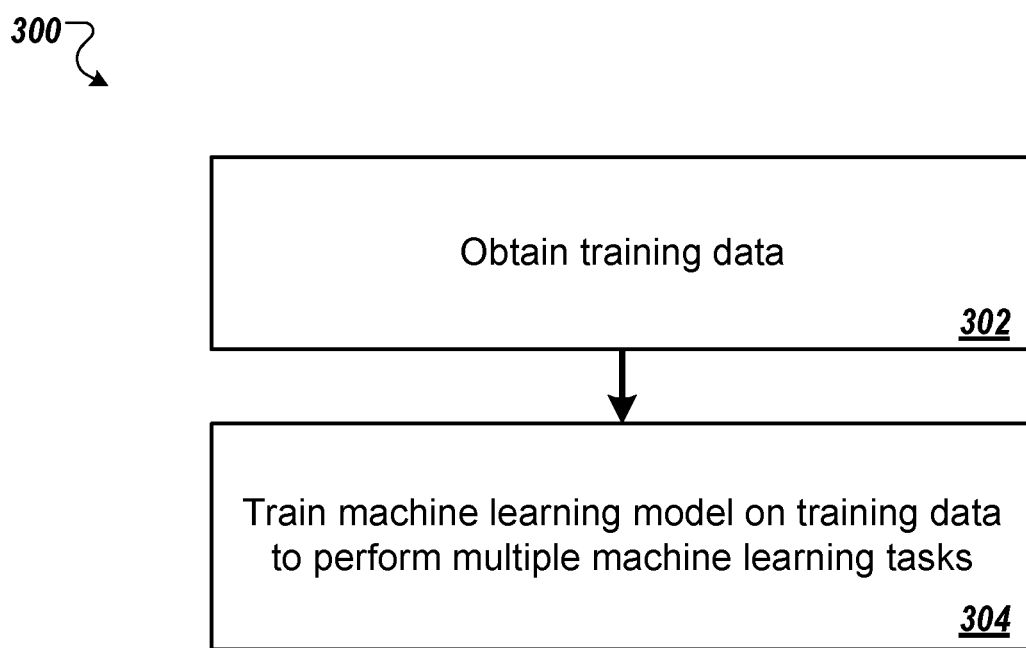
FIG. 3 is a flow diagram of an example process for training a machine learning system to perform implicit bridging of machine learning tasks.

FIG. 3 is a flow diagram of an example process 300 for training a machine learning model to perform implicit bridging of machine learning tasks. For example, the process 300 may be used to train the machine learning model 104 of FIG. 1. For convenience, the process 300 will be described as being performed by a system of one or more computers located in one or more locations. For example, a system for performing implicit bridging, e.g., the system 100 of FIG. 1, appropriately programmed in accordance with this specification, can perform the process 300.

The system obtains training data to train the machine learning model (step 302). The training data used to train the machine learning model includes a set of paired datasets, where each of the paired datasets includes an input dataset paired with an output dataset. In some implementations a model input received by the machine learning model at runtime may be a model input of a first input type, e.g., $input_1$, and a model output generated by the machine learning model may be a model output of a first output type, e.g., $output_1$. In some cases the set of paired datasets used to train the machine learning model may not include an input dataset of the first input type paired with an output dataset of the first output type, e.g., the set of paired datasets may not include the pair ($input_1$, $output_1$). For example, the set of paired datasets may include one or more of the pairs ($input_1$, $output_2$), ($input_2$, $output_2$), ($input_2$, $output_3$), ($input_3$, $output_1$), or ($input_3$, $output_3$), where the index indicates a type of input or output.

In some implementations the datasets in the set of paired datasets may be text segments in different languages. In this case, each paired dataset may then include an input text segment in an input language paired with an output text segment in an output language that is different from the input language. In these implementations a model input received by the machine learning model at runtime may be an input text segment in a first language, e.g., a text segment in Japanese, and a model output generated by the machine learning model may be a text segment in a second language, e.g., Korean. The set of paired datasets may not include a text segment in the first language paired with a text segment in the second language, e.g., the pair (Japanese, Korean). For example, the set of paired datasets may include pairs such as (English, Korean), (Korean, English), (English, Japanese), (Japanese, English).

Each of the paired datasets further includes a language identifier that specifies the machine learning task associated with the paired dataset, e.g., the paired dataset (English, Korean) may include an identifier that specifies that the English dataset be translated into a Korean dataset.

In some implementations the datasets in the set of paired datasets may be text segments in one or more languages, parse tree representations and sentiments. In this case, the paired datasets may include text segments paired with respective parse tree representations, and parse tree representations paired with respective sentiments. The model input received by the machine learning model at runtime may be an input text segment, e.g., "I hate flowers," and a model output generated by the machine learning model may be a sentiment, e.g., "negative." Each of the paired datasets further includes an identifier that specifies the task associated with the paired dataset, e.g., an identifier specifying "generate parse tree representation" or "predict sentiment."

The system trains the machine learning model on the training data to perform a set of machine learning tasks (step 304). The trains the machine learning model using standard machine learning techniques. For example, in cases where the machine learning model is a neural network, the system may train the neural network on the training data by processing a training input, e.g., a text segment in a source language, to generate a training output, e.g., a text segment in a target language, according to a given machine learning task, e.g., translating a given input into a text segment in a target language. The system may then compare the training output to a known output by computing a loss function, and backpropagating loss function gradients with respect to current neural network weights to determine an updated set of neural network weights that minimizes the loss function, as described above with reference to FIG. 1.

The set of machine learning tasks includes the machine learning task to be performed on the model input at runtime, as described above with reference to step 304. In other words, the machine learning model is trained to perform machine learning tasks that may be provided to the system at runtime. For example, continuing the example given above in step 302, in some cases the datasets in the set of paired datasets include text segments in different languages, e.g., Japanese, English, or Korean. In this example, each paired dataset includes an input text segment in an input language paired with a text segment in a target language that is different from the input language, e.g., (Japanese, English), (English, Japanese), (English, Korean), (Korean, English). The set of machine learning tasks may then include, for each paired dataset, translating an input text segment into a text segment in the target language, e.g., translating an input text segment into a text segment in English, translating an input text segment into a text segment in Japanese, and translating an input text segment into a text segment in Korean.

Through the training process 300, the machine learning model learns to process given model inputs according to a given machine learning task, even if the model has not been explicitly trained to perform the machine learning task on a model input of a particular type. For example, as described above, the machine learning model may learn to directly translate a text segment in Japanese into a corresponding text segment in Korean, even if the machine learning model was only trained to translate Japanese text into a third "bridge" language, and to translate the third language into Korean.

In some implementations, the system may extend the training process 300 to leverage available parallel data to improve the effectiveness of the process 300. In this context, parallel data describes training data for the machine learning task to be performed on the model input at runtime, as described above. In other words, parallel data may describe training data for a machine learning task that was not included in the training data obtained at step 302. Continuing the example above, parallel data may include training data that may be used to train the machine learning model to translate a text segment in Japanese into a corresponding text segment in Korean, e.g., paired datasets (Japanese, Korean).

The system may perform the steps 302 and 304 described above to train a machine learning model to perform implicit bridging of machine learning tasks. For example, as described above, the machine learning model can learn to directly translate a text segment in Japanese into a corresponding text segment in Korean, even if the training data obtained in step 302 included training data for training the machine learning model to translate Japanese text into a third "bridge" language, and to translate the third language into Korean.

The system obtains additional parallel training data to train the machine learning model to perform a machine learning task that was not represented by the training data obtained at step 302. Similarly to the training data described above with reference to step 302, the obtained parallel training data may include a set of paired datasets, where each of the paired datasets includes an input dataset paired with an output dataset. Continuing the example above, the parallel training data may include a set of text segments in Japanese paired with corresponding text segments in Korean. In some implementations the obtained parallel training data may be a small amount of training data. For example, the size of the parallel training data may be smaller than the sets of training data described above with reference to step 302, and/or the parallel training data may include fewer training examples than the sets of training data obtained at step 302.

The system trains the machine learning model to perform the machine learning task that was not represented by the training data obtained at step 302 using the obtained parallel training data. As described above, this may include applying standard machine learning techniques. For example, in cases where the machine learning model is a neural network, the system may train the neural network on the parallel training data by processing a parallel data training input, e.g., a text segment in the source language Japanese, to generate a parallel data training output, e.g., a text segment in the target language Korean. The system may then compare the parallel data training output to a known parallel data output by computing a loss function, and backpropagating loss function gradients with respect to current neural network weights to determine an updated set of neural network weights that minimizes the loss function, as described above with reference to FIG. 1.

The system may repeat this additional training process for additional parallel data as and when it becomes available to the system.

By incrementally training the multi-task machine learning model on additional parallel data for zero-shot directions, i.e., for machine learning tasks that were not represented by the originally obtained training data, the system may further refine the multi-task machine learning model and improve the accuracy of results obtained from using the machine learning model at run time. In some implementations performing an extended training process, as described above, may enable the machine learning model to perform some machine learning tasks with higher accuracy compared to models that are trained using a single training process with a mixture of available training data, i.e., training data that includes parallel data.

For illustrative purposes, the system and methods described in this specification have used machine translation as a primary example use case. However, the system and methods described may be applied to a variety of other settings, including other natural language tasks such as parsing or sentiment analysis. For example, the systems and methods may be used to predict a sentiment from a given sentence, e.g., to predict the sentiment of the phrase "I hate flowers." In this example, the system can be trained to perform two machine learning sub tasks, namely (1) translating a given text segment into a parse tree, and (2) predicting a sentiment of the parse tree. For example:
<2parsetree> I love flowers </s> (ROOT (S (NP (PRP I)) (VP (VBP love) (NP (NNS flowers))) (. .)))</s>
. . .
<2sentiment> (ROOT (S (NP (PRP I)) (VP (VBP love) (NP (NNS flowers))) (. .)))</s> positive </s>.

The system may then directly learn to bridge from sentence to sentiment:
<2sentiment> I hate flowers </s>"negative".

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that are operable, when executed by the one or more computers, to cause the one or more computers to perform operations comprising:
   receiving (i) a source language text segment, and (ii) data identifying a target language that the source language text segment is to be translated into by a machine learning model, wherein:
      the machine learning model has been trained on a plurality of different paired data sets, each paired data set includes (iii) first language text segments in a respective first language and (iv) second language text segments in a respective second language that are translations of the first language text segments into the second language, and wherein the machine learning model has not been trained on any paired data sets that include translations of text segments from the source language into the target language;

augmenting the source language text segment with an identifier that identifies at least the target language to generate an augmented model input; and processing the augmented model input using the machine learning model to generate a target language text segment that is a translation of the source language text segment into the target language even though the machine learning model has not been trained on any paired data sets that include translations of text segments from the source language into the target language.

2. The system of claim 1, wherein the machine learning model comprises (i) an encoder subsystem configured to receive an augmented model input, and (ii) a decoder subsystem configured to generate the target language text segment.

3. The system of claim 2, wherein the encoder subsystem and decoder subsystem comprise respective recurrent neural networks.

4. The system of claim 2, wherein the decoder subsystem comprises an attention mechanism.

5. The system of claim 1, wherein the augmented model input comprises the source language text segment with a prepended token identifier for at least the target language.

6. A computer-implemented method comprising:

receiving (i) a source language text segment, and (ii) data identifying a target language that the source language text segment is to be translated into by a machine learning model, wherein:

the machine learning model has been trained on a plurality of different paired data sets, each paired data set includes (iii) first language text segments in a respective first language and (iv) second language text segments in a respective second language that are translations of the first language text segments into the second language, and wherein the machine learning model has not been trained on any paired data sets that include translations of text segments from the source language into the target language;

augmenting the source language text segment with an identifier that identifies at least the target language to generate an augmented model input; and processing the augmented model input using the machine learning model to generate a target language text segment that is a translation of the source language text segment into the target language even though the machine learning model has not been trained on any paired data sets that include translations of text segments from the source language into the target language.

7. The method of claim 6, wherein the machine learning model comprises (i) an encoder subsystem configured to receive an augmented model input, and (ii) a decoder subsystem configured to generate the target language text segment.

8. The method of claim 7, wherein the encoder subsystem and decoder subsystem comprise respective recurrent neural networks.

9. The method of claim 2, wherein the decoder subsystem comprises an attention mechanism.

10. The method of claim 6, wherein the augmented model input comprises the source language text segment with a prepended token identifier for at least the target language.

11. One or more non-transitory computer-readable storage media storing instructions that when executed by one or more computers cause the one or more computers to perform operations comprising:

receiving (i) a source language text segment, and (ii) data identifying a target language that the source language text segment is to be translated into by a machine learning model, wherein:

the machine learning model has been trained on a plurality of different paired data sets, each paired data set includes (iii) first language text segments in a respective first language and (iv) second language text segments in a respective second language that are translations of the first language text segments into the second language, and wherein the machine learning model has not been trained on any paired data sets that include translations of text segments from the source language into the target language;

augmenting the source language text segment with an identifier that identifies at least the target language to generate an augmented model input; and processing the augmented model input using the machine learning model to generate a target language text segment that is a translation of the source language text segment into the target language even though the machine learning model has not been trained on any paired data sets that include translations of text segments from the source language into the target language.

12. The computer-readable storage media of claim 11, wherein the machine learning model comprises (i) an encoder subsystem configured to receive an augmented model input, and (ii) a decoder subsystem configured to generate the target language text segment.

13. The computer-readable storage media of claim 12, wherein the encoder subsystem and decoder subsystem comprise respective recurrent neural networks.

14. The computer-readable storage media of claim 12, wherein the decoder subsystem comprises an attention mechanism.

15. The computer-readable storage media of claim 11, wherein the augmented model input comprises the source language text segment with a prepended token identifier for at least the target language.

* * * * *